United States Patent [19]

Kellogg et al.

[11] 4,436,288
[45] Mar. 13, 1984

[54] METAL MACHINING DEVICE WITH CONTROL CIRCUIT ISOLATION

[75] Inventors: James D. Kellogg; August C. Mingesz, both of Milwaukee, Wis.

[73] Assignee: C-R-O, Inc., Menomonee Falls, Wis.

[21] Appl. No.: 424,621

[22] Filed: Sep. 27, 1982

[51] Int. Cl.³ .................................................. B23K 7/02
[52] U.S. Cl. ........................................................ 266/69
[58] Field of Search .................................... 266/69, 58

[56] References Cited

U.S. PATENT DOCUMENTS

| 4,132,392 | 1/1979 | Hooper | 266/69 |
| 4,168,056 | 9/1979 | Haley | 266/69 |
| 4,234,777 | 11/1980 | Balfanz | 219/125.1 |

*Primary Examiner*—W. Stallard
*Attorney, Agent, or Firm*—Andrus, Sceales, Starke & Sawall

[57] ABSTRACT

A metal machining device includes a pair of longitudinally movable gantries and a connecting transverse bridge which mounts carriages which carry machining tools. A computer numerical control unit is fixedly mounted adjacent one end of the bridge and is connected to supplemental electronic circuits. The transverse tool-carrying bridge is formed as a generally hollow heavy-walled closed box-beam which has mounted therein at least part of the supplemental electronic circuitry. A beam side-wall is provided with a plurality of doors which open to permit access to a plurality of circuit-holding drawers. When the doors are closed, the bridge forms a unitary hollow housing containing the supplemental electronic circuitry which serves to mechanically and electronically isolate them and substantially reduce the radiation of electronic noise therefrom to the computer. The removal and harness-like fixing of at least some of the connecting electronic cables to within the bridge serves to reduce the problems of electronic coupling and other interference. Further improvement in isolating is accomplished by placing progressively noisier supplemental circuits in drawers which are progressively farther away from the computer.

4 Claims, 4 Drawing Figures

METAL MACHINING DEVICE WITH CONTROL CIRCUIT ISOLATION

U.S. PRIOR ART OF INTEREST

U.S. Pat. No. 4,255,643 to Balfanz, issued Mar. 10, 1981.

BACKGROUND AND SUMMARY OF THE INVENTION

This invention relates to a metal machining device with control circuit isolation.

Machining devices for cutting or joining large metal workpieces often are constructed to provide a pair of gantries mounted for movement along longitudinal rails, and a transverse elongated metal bridge extending between the gantries. The bridge is constructed to carry one or more carriages which in turn carry machining tools, such as welding heads or cutting torches.

In recent years, the primary control for gantry, carriage and tool movement and operation has been a so-called CNC (computerized numerical control) unit which has been fixedly mounted adjacent one end of the bridge, as for example in one of the gantries. The CNC unit includes a programmable computer and numerous primary electronic circuits which are responsive to a power input and which provide various outputs to operate the machine.

Both the power input and the various outputs include supplemental electronic circuits. The present practice has been to dispose many of these supplemental circuits in separate thin-walled box-like housings which are mounted to the exterior of the bridge and gantries, wherever there is room to put them. The connecting electronic cables have formed, together with the torch or welding head supply systems, an exposed spaghetti-like network of connecting elements which can be positioned differently each time and which, through proximity, can become electrically coupled and/or act as antennas which receive the noise and transmit the undesirable signals back to the CNC.

At least some of the supplemental circuits create radiating electronic noise which, it has been found, can undesirably interfere with the proper operation of the computer of the CNC unit.

It is a task of the invention to reduce the aforementioned problems.

In accordance with the various aspects of the invention, the transverse tool-carrying bridge is formed as a generally hollow heavy-walled closed box-beam which has mounted therein at least part of the supplemental electronic circuitry. A beam side-wall is provided with a plurality of doors which open to permit access to a plurality of circuit-holding drawers. When the doors are closed, the bridge forms a unitary hollow housing containing the supplemental electronic circuitry which serves to mechanically and electronically isolate them and substantially reduce the radiation of electronic noise therefrom to the computer. The removal and harness-like fixing of at least some of the connecting electronic cables to within the bridge serves to reduce the problems of electronic coupling and other interference. Further improvement in isolating is accomplished by placing progressively noisier supplemental circuits in drawers which are progressively farther away from the computer.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
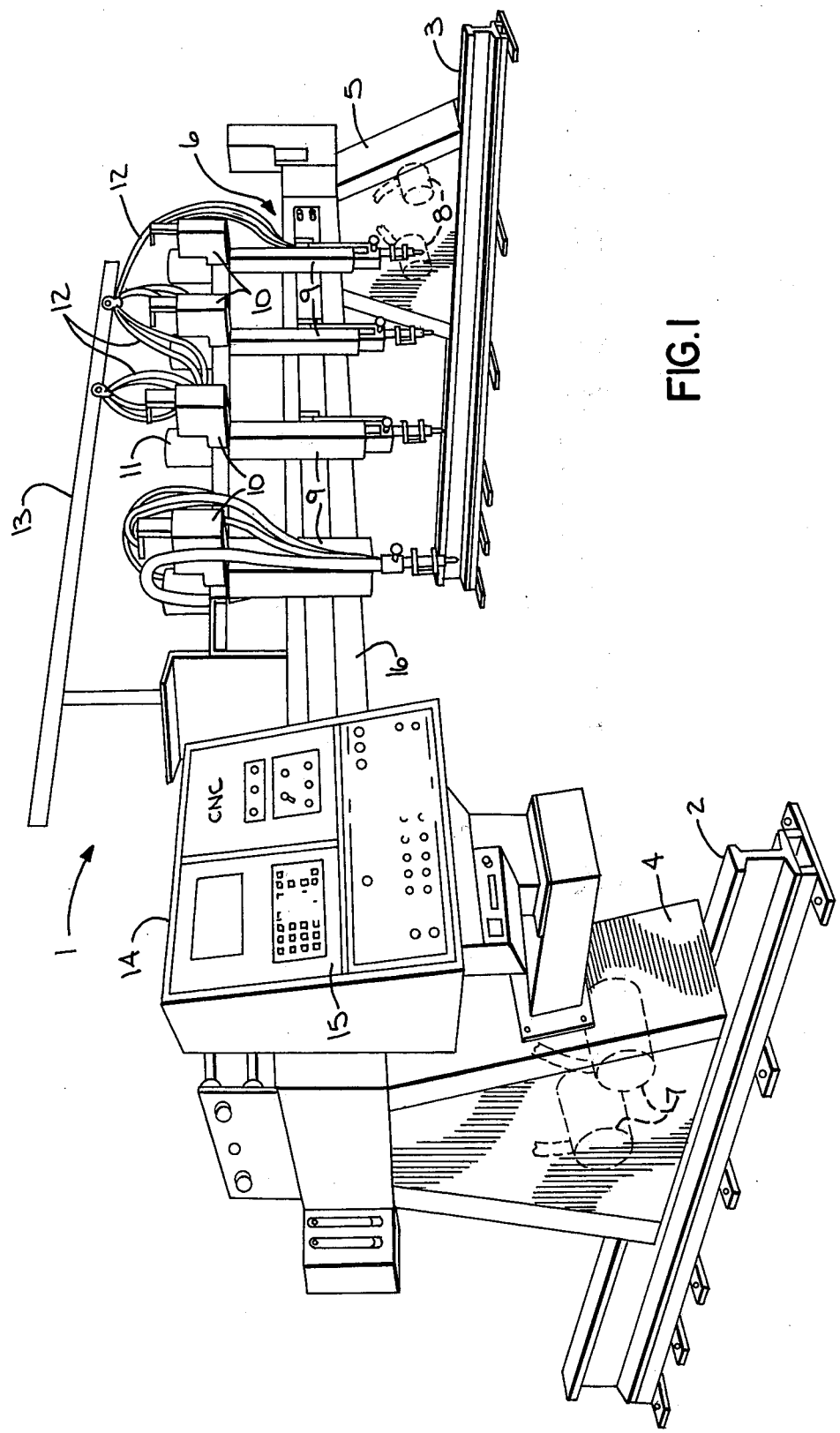
FIG. 1 is a front perspective view of a metal machining device incorporating the various aspects of the invention.

The preferred embodiment incorporating the concepts of the invention is illustrated in the drawings wherein a metal machining device 1 is adapted to be mounted on a pair of longitudinal rails 2 and 3 which are secured to the floor. Support gantries 4 and 5 are mounted for movement along the respective rails, with the gantries supporting the ends of a transverse bridge 6 which extends over the machining area.

Bridge 6 is adapted to be driven in a longitudinal direction by any suitable motive means, such as motors 7 and 8 which are mounted in gantries 4 and 5 and drivingly connect to rails 2 and 3, as explained in greater detail in the aforementioned U.S. Pat. No. 4,255,643. Likewise, one or more thermal tool machining assemblies 9, which in this case are shown as including plasma torch heads, are suspended from carriages 10 adapted to be driven along bridge 6 as by motors 11 which are drivingly connected to the bridge. The heads are adapted to machine a horizontally disposed fixed metal workpiece, not shown.

Reference is again made to U.S. Pat. No. 4,225,643. Assemblies 9 are supplied with gas and electrical power through input lines 12 which may be at least partially mounted to a festoon device 13.

Motors 7, 8, 11 and assemblies 9 are adapted to be primarily controlled from a thin-walled primary control box 14 fixedly mounted adjacent one end of bridge 6, in this instance on gantry 4. Box 14 contains a computerized numerical control (CNC) having numerous electronic circuits, as well as the usual front control panel 15 with actuators and indicia thereon. The CNC is of the type which is now quite common to this type of machine.

As is customary, box 14 does not contain all of the electronics for the machine, there also being the need for supplemental electronic circuits connected to the computer. As previously pointed out, at least some of these electronic circuits may radiate electronic "noise" which could interfere with the CNC operation.

As shown in the drawings, bridge 6 is constructed to form a rigid enclosed elongated heavy-walled hollow box-beam housing having end walls, front and rear side walls 16 and 17 as well as top and bottom walls 18 and 19. The beam-bridge is substantially wider than its height and is adapted to enclose the said electronic circuits therewithin to provide electronic noise isolation.

In the embodiment disclosed, rear wall 17 which is on the side remote from assemblies 9 is formed to provide a plurality of normally closed doors, in this instance there being four doors 20, 21, 22 and 23. Doors 20-23 are provided with suitable locking devices 24 and are hinged along their lower edges, as at 25, so that they can drop open (see FIGS. 2 and 3) to expose the interior hollow chamber 26 formed within bridge 6.

Opening of each door 20-23 permits access to a drawer 27 mounted within chamber 26, and with each drawer being mounted to slide outwardly of bridge 6, as on rollers 28 and tracks 29 or any other suitable elements.

Each drawer 27 is designed to receive and hold a secondary electronic circuit 30 which is modular and comprises a plurality of plug-in circuit boards 31 mounted to a base 32. Circuits 30 are connected to each other and/or the CNC and/or the drive and machining elements, via cables 33, which are disposed within the confines of bridge chamber 26 and thereby in effect are harnessed in fixed position. They can therefore be installed to eliminate any problem of electronic coupling or antenna effect caused by the inconsistencies of manufacturing techniques.

Also, the described construction isolates circuits 30 within the tool carrying bridge 6 to reduce the radiation and transmission of electronic noise.

It is contemplated that the circuits 30 in the various drawers will be of differing types and thus will radiate electronic noise of differing intensities. A further reduction in the ability of this noise to adversely affect the CNC computer will be accomplished by disposing progressively noisier circuit portions in drawers which are progressively more remote from the computer.

Figure 2:
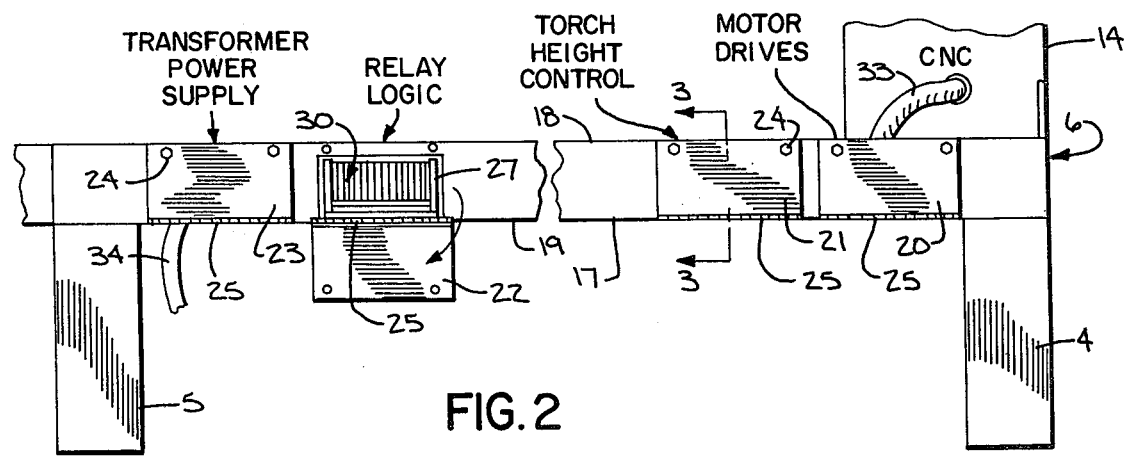
FIG. 2 is a fragmentary rear elevation of the device, with parts removed for clarity, and showing the bridge and electronic circuit holding drawer arrangement.
Figure 3:
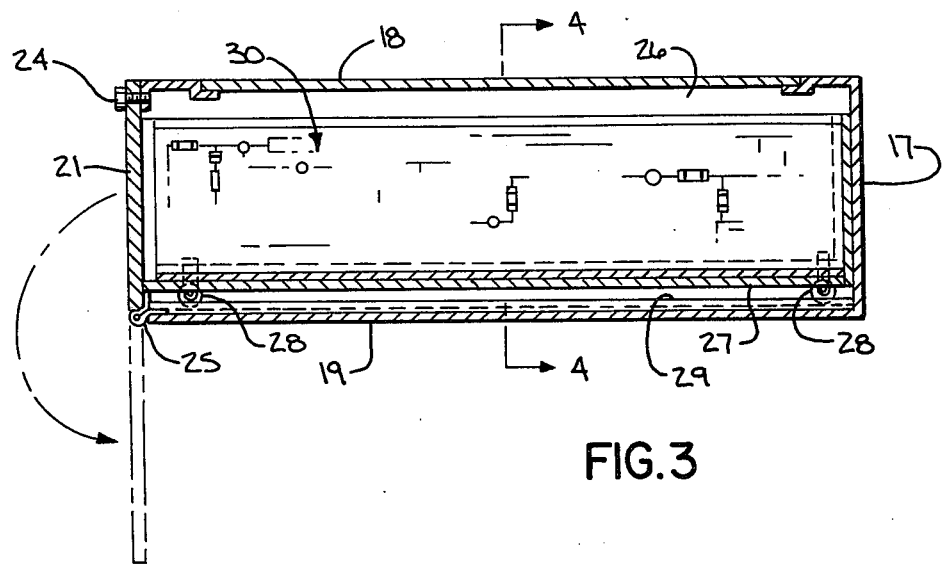
FIG. 3 is an enlarged transverse section taken through one of the drawers on line 3—3 of FIG. 2.
Figure 4:
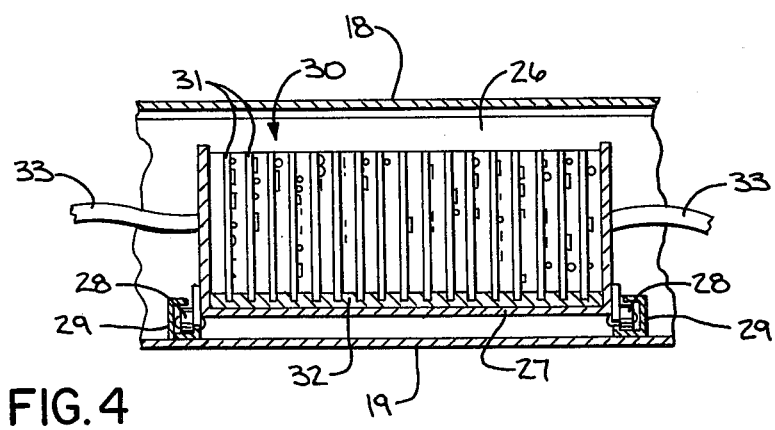
FIG. 4 is a section taken on line 4—4 of FIG. 3.

As an example which is illustrated in FIG. 2, the drawers behind doors 20-23 contain, respectively, the circuits for the motor drives, torch height control, relay logic and power supply (from external source via cable 34). These circuits tend to be progressively noisier in the order stated, and are thus placed in drawers progressively more remote from the computer.

The dimensions of bridge 6 are such that most present day supplemental circuits can fit therewithin. However, if certain circuits are too large and are very noisy, they should at a minimum be placed at a point most remote from the CNC, such as on gantry 5, or even off the machine and beyond.

The aspects of the invention provide a unique dual function for bridge 6, which not only carries the machining tools but also houses and electronically isolates at least some of the secondary electronic circuits which are connected to the CNC.

Various modes of carrying out the invention are contemplated as being within the scope of the following claims particularly pointing out and distinctly claiming the subject matter which is regarded as the invention.

We claim:

1. In a device for machining horizontally disposed fixed metal workpieces:
   (a) a pair of gantries mounted for movement along longitudinally extending rails,
   (b) an elongated transverse tool carrying bridge extending between said gantries and with said bridge having tool means mounted for movement therealong,
   (c) a programmable computerized numerical machining control unit mounted adjacent one end of said bridge,
   (d) supplemental electronic circuit means connected to said control unit,
   (e) and said tool carrying bridge enclosing said circuit means therewithin so that electronic noise emanating from said circuit means is isolated thereby from said computerized control unit.

2. The device of claim 1:
   (a) wherein said bridge forms a generally hollow heavy-walled box-beam housing for said circuit means,
   (b) and which includes a plurality of spaced slide-out drawers disposed within and longitudinally along said bridge, with said drawers mounting portions of said electronic circuit means,
   (c) the side wall of said bridge forming normally closed openable doors for gaining access to said drawers and said electronic circuit means.

3. The device of claim 2 wherein said doors are disposed in the side wall of said bridge remote from said tool means.

4. The device of claim 2 or 3 wherein:
   (a) at least some portions of said supplemental electronic circuit means radiate electronic noise of differing intensity,
   (b) progressively noisier circuit portions being disposed in drawers which are progressively more remote from said computerized control unit.

* * * * *